Nov. 4, 1924.
E. HODGKINSON
RECORDING INSTRUMENT
Filed Oct. 18, 1922
1,514,524
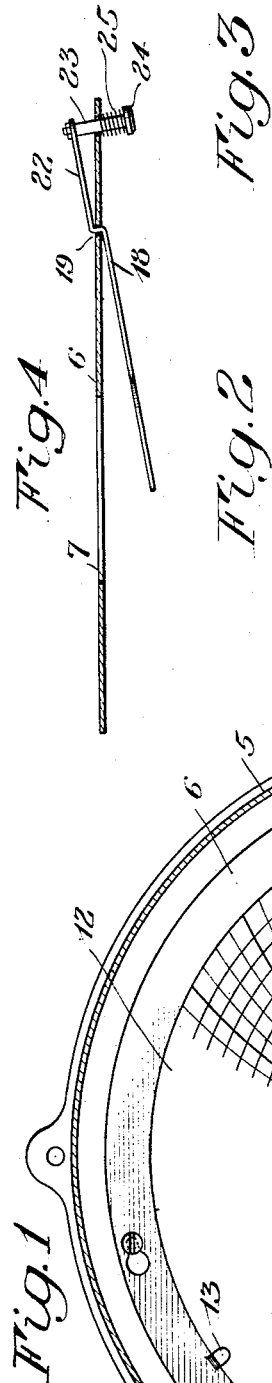
INVENTOR.
Edwin Hodgkinson
BY
his ATTORNEY Patented Nov. 4, 1924.

1,514,524

UNITED STATES PATENT OFFICE.

EDWIN HODGKINSON, OF ROCHESTER, NEW YORK, ASSIGNOR TO TAYLOR INSTRUMENT COMPANIES, OF ROCHESTER, NEW YORK, A CORPORATION OF NEW YORK.

RECORDING INSTRUMENT.

Application filed October 18, 1922. Serial No. 595,422.

*To all whom it may concern:*

Be it known that I, EDWIN HODGKINSON, of Rochester, in the county of Monroe and State of New York, have invented certain new and useful Improvements in Recording Instruments; and I do hereby declare the following to be a full, clear, and exact description of the same, reference being had to the accompanying drawings, forming a part of this specification, and to the reference numerals marked thereon.

This invention relates to recording instruments, such, for example, as that disclosed in my prior Letters Patent No. 1,060,761, granted May 6, 1913, and more particularly to instruments of this character provided with means facilitating the application and removal of a record chart.

One object of the invention is to provide an instrument of this type having practical and convenient means for quickly releasing or stripping a chart from its supporting or holding means to facilitate its removal from the instrument.

Another object is to provide in combination with such stripping means a device for automatically moving the marking device out of contact with the chart as the latter is released or stripped to free it for removal from the instrument and to prepare the latter for quickly and conveniently applying a fresh chart thereto.

To these and other ends the invention consists in certain improvements and combinations of parts all as will hereinafter be more fully described, the novel features being pointed out in the claims at the end of the specification.

In the drawings:

Figure 1 is a front view of a portion of a recording instrument embodying the present invention with a portion of the casing and of a chart thereon broken away for purposes of clearness;

Figure 2 is a fragmentary view of the same partly in central section and partly in elevation;

Figure 3 is an elevation of parts shown in Figure 2 detached and in a different operating position;

Figure 4 is a sectional view on the line 4ª—4ª of Figure 1.

Similar reference numerals throughout the several views indicate the same parts.

The invention is shown as embodied in the present instance in conjunction with an instrument for recording temperatures, pressures and the like comprising a casing 5 and chart holding means therein including a stationary plate 6 having a central opening 7 in which is supported, substantially in the plane of the plate, a disk 8 rotated by a spindle 9 driven by a time train 10 of any suitable variety. The chart disk 8 is provided on its face with pointed elements 11 adapted to pierce and retain a chart 12 applied to the holding means with the usual central opening of the chart centered on the outer end of spindle 9. Plate 6 is provided with fingers 13 overlying the periphery of the chart for holding it against the supporting means as it is rotated by disk 8. At 14 is a marking means comprising, in the present instance, a resilient arm having a pen portion 15 normally bearing against a chart on the holding means and adapted to be moved into and out of contact with the latter to permit the chart to be applied to and removed from the machine, the arm being, of course, actuated by suitable mechanism such, for example, as temperature or pressure responsive means, as disclosed in said Letters Patent and well understood in the art. At 16 is a cover for the front of the casing provided with a crystal or glass 17, the cover being movable toward and from closed position on the casing to afford access to the chart and the mechanism.

The present invention resides in the combination with an instrument such as described of a device for releasing or stripping a chart from the holding means to facilitate its removal from the instrument and of a device for moving and retaining the pen arm out of contact with the chart during the application and removal of the same, these devices being simultaneously actuated from a single manually operable part or fingerpiece. The pen lifting device is preferably arranged to maintain the pen clear of the chart until returned to inactive position to free the pen by contact with the cover as the latter is returned to closed position.

Referring more particularly to the drawings, there is shown at 18, Figures 1 and 4, a lever formed from a strip of suitably stiff material having a transversely turned portion 19 passing through a slot 20 in plate 6 so that the lever is in effect pivoted on the plate and retained in such position by the angular shape shown. The lever thus has one end extending between the plate and chart and bifurcated to provide spaced end portions 21 substantially embracing the chart disk 8 adjacent the path of movement of the elements 11 releasably securing the chart thereon. The other end of lever 18 extends in rear of plate 6 adjacent the periphery of the latter as at 22 and has secured thereto a plunger 23 sliding through an opening in the plate forwardly of the latter at which end it is provided with a manually operable button or finger-piece 24. Between the latter and the plate is a compression spring 25 coiled about the plunger for normally urging the lever to inactive position in which its ends 21 are disposed adjacent plate 6 and plunger 23 is in its forward position as shown in Figure 2. With the stripping device in this position a chart may be applied to the holding means by fitting its usual central opening on spindle 9 and pressing it against disk 8 to cause the pointed elements 11 to pierce and retain the chart in position thereon, the periphery of the chart being of course slipped under fingers 13. After a record has been made on the chart, the casing cover 16 is opened and plunger 23 depressed which throws lever ends 21 forwardly and strips the chart from the elements 11 and spindle 9, so that the chart may be easily and quickly removed from the instrument as for example by inserting a pencil or other pointed instrument through its central opening.

During the application and removal of a chart it is desirable to move and retain the pen arm clear of the latter to prevent injury of the arm or pen and the smearing of ink on the chart. This is advantageously accomplished by the means of the present invention comprising a lever 26 pivoted at 27 upon a lug 28 extending rearwardly from plate 6. The lever has an angularly turned portion 29 extending between the pen arm and chart and the other end 30 of the lever extends back of plunger 23 for actuation by the latter when depressed in the manner described for stripping a chart from the instrument. Such actuation of the lever by the plunger throws its portion 29 forwardly and lifts the pen arm free of the chart and the lever preferably has a form of pivotal support of any suitable character affording frictional restraint or resistance to the movement thereof so that it tends to retain its adjusted position. As a result, when plunger 23 is depressed to strip a chart from the holding means, the plunger returns when released to its forward position, but lever 26 retains the position shown in Figure 3 to which it is moved by depression of the plunger and thus maintains the pen arm clear of the chart and of plate 6.

Lever 26, however, is provided with a portion 32 preferably of the resilient loop form shown and so disposed as to be engaged by the cover as shown in Figure 2 when the latter is moved to closed position. This arrangement therefore provides for automatically returning the lever to inactive position thereby permitting the pen arm to return into contact with the chart.

The chart stripping and pen lifting devices are simple and practical in construction and efficient in operation and are so combined that a single manually operable member serves to simultaneously operate both and provide for convenient removal of the chart while the pen lifting device retains the pen in an out-of-the-way position during the application of a fresh chart. The closure of the cover then automatically releases the pen for marking so that the application and removal of the chart is rendered a simple, quick and convenient operation.

I claim as my invention:

1. A recording instrument comprising a chart holding means and a device movably carried by the instrument for stripping a chart from said holding means.

2. A recording instrument comprising chart holding means provided with attaching means for releasably securing a chart thereto and a device movably carried by the instrument for stripping a chart from said attaching means to facilitate removal of the same from the instrument.

3. A recording instrument comprising rotary chart holding and driving means provided with attaching means for releasably securing a chart thereto and a device movably carried by the instrument adjacent the path of movement of said attaching means for stripping a chart from the latter to facilitate removal of the same from the instrument.

4. A recording instrument comprising chart holding means provided with elements for piercing a chart to releasably secure the same thereto and a device movably carried by the instrument and extending between said holding means and a chart thereon for stripping the latter from said elements to facilitate removal thereof from the instrument.

5. In a recording instrument, the combination of chart holding means comprising a supporting plate having a rotary disk at its center provided with means for releasable driving engagement with a chart, a device movably supported on said plate with spaced end portions extending between said plate and a chart thereon and substantially embracing said disk adjacent the path of movement of said chart engaging means, resilient means normally holding said device in inactive position, and a manually engageable portion for moving said device to strip a chart from said chart engaging means to facilitate its removal from the instrument.

6. In a recording instrument, the combination with chart holding means and a marking means for cooperation with a chart carried thereby, of mechanism provided with means for moving said marking means out of engagement with a chart and for stripping the latter from said holding means to facilitate removal thereof from the instrument.

7. A recording instrument comprising chart holding means provided with attaching means for releasably securing a chart thereto, marking means for cooperation with a chart on said holding means and movable into and out of contact with the chart, and a single manually operable member having means for moving said marking means out of contact with a chart and having also means for stripping a chart from said attaching means to facilitate removal thereof from the instrument.

8. A recording instrument comprising chart holding means having attaching means for releasably securing a chart thereto and a pen arm for cooperation with a chart on said holding means and movable toward and from the same, and mechanism on said instrument provided with means for moving said arm out of contact with a chart and also with means for stripping a chart from said attaching means to facilitate removal thereof from the instrument.

9. The combination with a recording instrument having a movable cover, chart holding means, and a marking means for cooperation with a chart on said holding means, of means for stripping a chart from said holding means, and a device for moving said marking device out of contact with a chart on said holding means actuated in one direction by movement of said stripping means and in the other direction by movement of said cover.

10. The combination with a recording instrument having a cover movable to open and closed positions, chart holding means, and a marking means for cooperation with a chart on said holding means, of means for stripping a chart from said holding means, and a device moved by actuation of said stripping means to move and retain said marking means out of contact with a chart, said device being moved in the other direction and the marking means returned to contact with the chart by movement of said cover to closed position.

11. The combination with a recording instrument having a cover movable to open and closed positions, chart holding means, and a resilient pen arm for cooperation with a chart on said holding means and movable into and out of contact therewith, of means for stripping a chart from said holding means, and a lever movably carried by the instrument for engagement with said pen arm and with said stripping means and moved by actuation of the latter to move and retain the pen arm out of contact with the chart, said lever being provided with means for retaining it in adjusted position and being returned to permit return of said pen arm to chart engaging position by movement of said cover to closed position.

12. In a recording instrument, a casing having a cover movable to and from closed position, chart holding means provided with elements for releasably attaching a chart thereto, a pen arm normally bearing on the chart and movable into and out of contact therewith, a device movably carried by the instrument having means for stripping a chart from said holding means, spring means for urging said device to inactive position, a plunger for actuating said device, a lever having a portion arranged for actuation by said plunger and also a portion adapted upon actuation to move said pen arm out of contact with the chart to free the latter for removal, said lever having frictional restraining means for retaining it in adjusted position, and a part on said lever arranged for engagement by said cover when the latter is closed for returning said lever to inactive position and releasing said pen arm.

EDWIN HODGKINSON.